United States Patent
Inoue

(10) Patent No.: US 11,153,024 B2
(45) Date of Patent: Oct. 19, 2021

(54) OPTICAL TRANSMISSION APPARATUS, OPTICAL COMMUNICATION SYSTEM AND OPTICAL COMMUNICATION METHOD

(71) Applicant: NEC CORPORATION, Tokyo (JP)

(72) Inventor: Takanori Inoue, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/967,164

(22) PCT Filed: Mar. 20, 2019

(86) PCT No.: PCT/JP2019/011627
§ 371 (c)(1),
(2) Date: Aug. 4, 2020

(87) PCT Pub. No.: WO2019/188633
PCT Pub. Date: Oct. 3, 2019

(65) Prior Publication Data
US 2021/0036797 A1    Feb. 4, 2021

(30) Foreign Application Priority Data

Mar. 27, 2018 (JP) .............................. JP2018-060464

(51) Int. Cl.
*H04J 14/02* (2006.01)
*H04B 10/25* (2013.01)
*H04B 10/572* (2013.01)

(52) U.S. Cl.
CPC .......... *H04J 14/0212* (2013.01); *H04B 10/25* (2013.01); *H04B 10/572* (2013.01)

(58) Field of Classification Search
CPC .... H04J 14/0212; H04B 10/25; H04B 10/572
(Continued)

(56) References Cited

U.S. PATENT DOCUMENTS

| 6,577,652 B1 * | 6/2003 | Kamata | ............... H04J 14/0212 370/534 |
| 2008/0080865 A1 * | 4/2008 | Muro | .................. H04J 14/0204 398/83 |

(Continued)

FOREIGN PATENT DOCUMENTS

| EP | 2595334 A2 | 5/2013 |
| EP | 3197078 A1 | 7/2017 |

(Continued)

OTHER PUBLICATIONS

Internal search report for PCT/JP2019/011627 dated Jun. 4, 2019.
(Continued)

*Primary Examiner* — Dalzid E Singh
(74) *Attorney, Agent, or Firm* — Sughrue Mion, PLLC

(57) ABSTRACT

To reduce deterioration of signal quality, an optical transmission apparatus comprises a transmission means for outputting an optical signal, and a multiplexing device for outputting a wavelength multiplexed optical signal including the optical signal inputted from the transmission means, wherein the multiplexing device includes an input port that is set to transmit a first wavelength band of the optical signal inputted from the transmission means, an intensity adjustment unit that can adjust an amount of optical attenuation for each predetermined wavelength band, and adjusts the amount of optical attenuation of an edge band of the first wavelength band of the optical signal transmitted through the input port to be smaller than the amount of optical attenuation of a central band of the first wavelength band, and an output port that outputs a wavelength multiplexed optical signal including the optical signal with the adjusted amount of optical attenuation.

9 Claims, 24 Drawing Sheets

(58) Field of Classification Search
USPC .......................................................... 398/83
See application file for complete search history.

(56) References Cited

U.S. PATENT DOCUMENTS

| | | | | |
|---|---|---|---|---|
| 2009/0208227 | A1* | 8/2009 | Yoshida | H04B 10/2939 |
| | | | | 398/202 |
| 2010/0150563 | A1* | 6/2010 | Nakajima | H04J 14/0213 |
| | | | | 398/81 |
| 2013/0142516 | A1 | 6/2013 | Zhou | |
| 2020/0067624 | A1* | 2/2020 | Tsuzuki | H04J 14/0267 |

FOREIGN PATENT DOCUMENTS

| | | |
|---|---|---|
| JP | 2011-160162 A | 8/2011 |
| JP | 2013-45079 A | 3/2013 |
| JP | 2013-106328 A | 5/2013 |
| JP | 2016-220204 A | 12/2016 |
| WO | 2012/051260 A1 | 4/2012 |

OTHER PUBLICATIONS

Written opinion for PCT/JP2019/011627 date Jun. 4, 2019.
Extended European Search Report for EP Application No. EP19778140.4 dated Apr. 21, 2021.

* cited by examiner

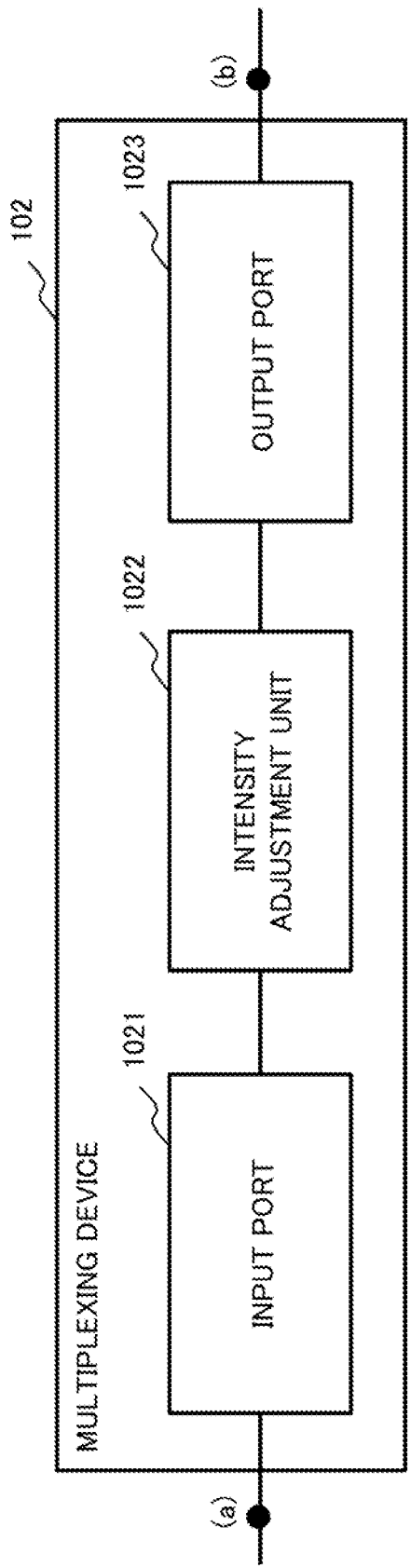

WAVELENGTH BAND
OF OPTICAL SIGNAL

WAVELENGTH BAND
ALLOWED TO PASS
THROUGH

WAVELENGTH BAND
ALLOWED TO PASS
THROUGH

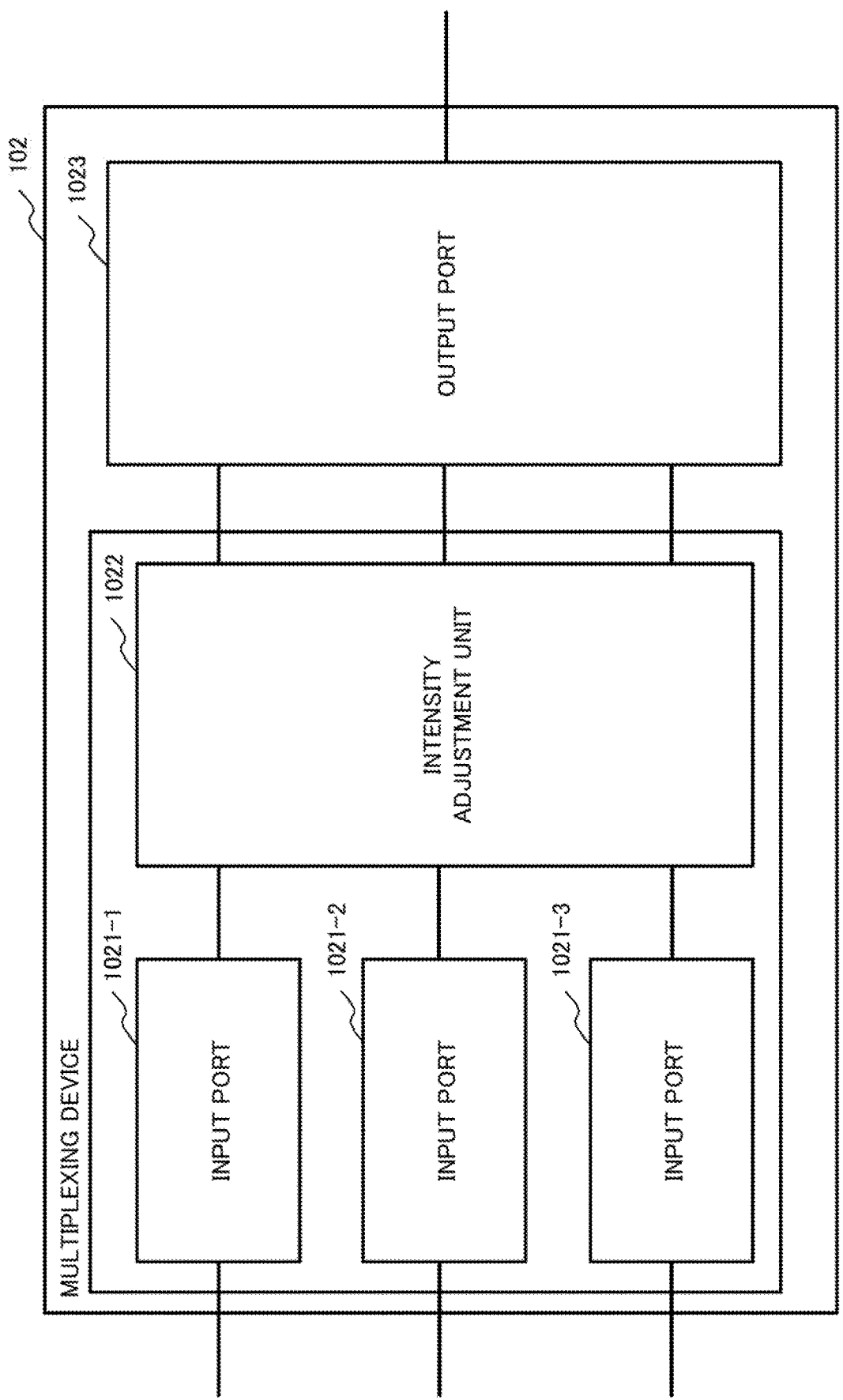

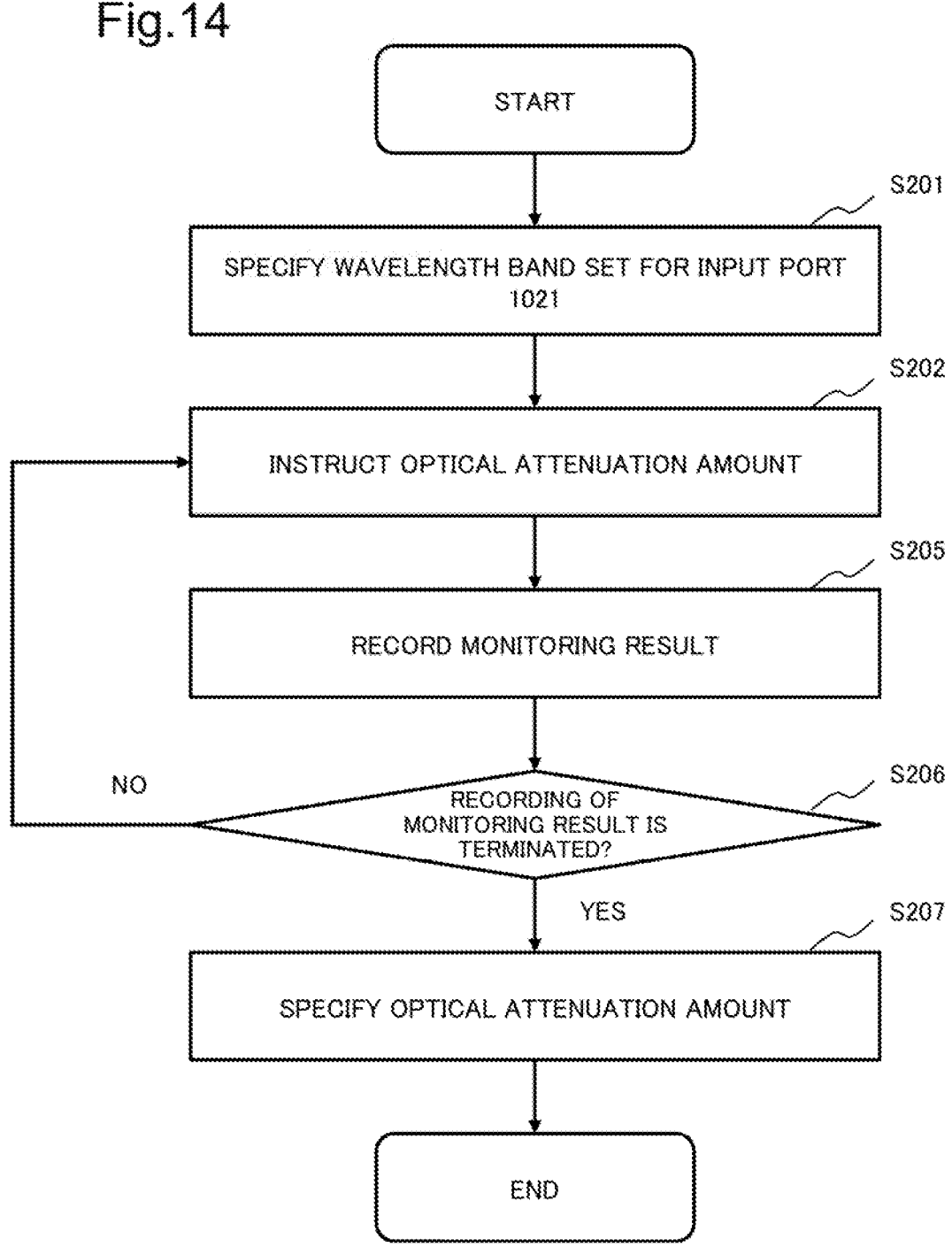

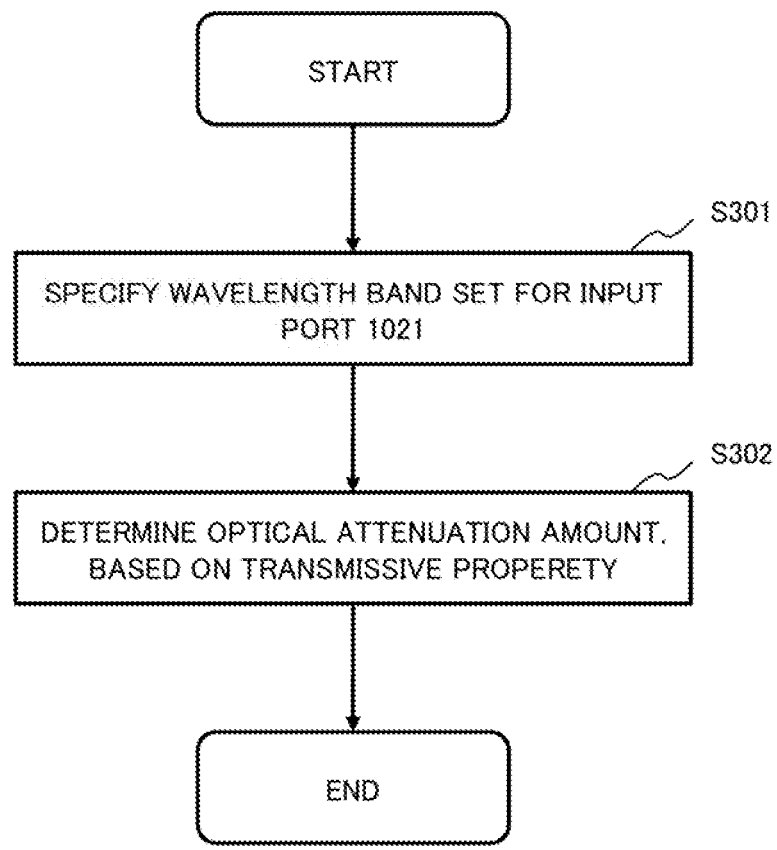

500&& # OPTICAL TRANSMISSION APPARATUS, OPTICAL COMMUNICATION SYSTEM AND OPTICAL COMMUNICATION METHOD

CROSS-REFERENCE TO RELATED APPLICATIONS

This application is a National Stage of International Application No. PCT/JP2019/011627 filed on Mar. 20, 2019, which claims priority under U.S.C. § 119(a) to Japanese Patent Application No. JP2018-060464 filed on Mar. 27, 2018, the entire disclosure of which is incorporated herein.

TECHNICAL FIELD

The present invention relates to an optical transmission apparatus, an optical submarine cable system, and an optical communication method.

BACKGROUND ART

A backbone long-distance optical communication system uses a wavelength division multiplexing (WDM) method in which an optical signal of each wavelength is multiplexed and transmitted for the purpose of achieving large-capacity communication. In the WDM method, a WDM signal constituted of a plurality of optical signals having different wavelengths is transmitted through one optical fiber.

In the optical communication system adopting the WDM method, a wavelength selective switch (WSS) is provided as a wavelength selection device that controls transmission of an optical signal per wavelength unit. The WSS is capable of subjecting an input WDM signal to multiplexing/demultiplexing per wavelength unit and controlling of an optical attenuation amount.

An optical submarine cable system also adopts the WDM method, and it is examined to provide the WSS inside an optical transmission apparatus provided in a land station house and a branch apparatus provided onto a submarine cable. For example, PTL 1 discloses an optical transmission apparatus including a wavelength selective switch (WSS) that multiplexes a plurality of optical signals and outputs the multiplexed optical signal.

In this case, the WSS has a transmissive property, and hence there arises a problem that signal quality is degraded by reduction of a spectral width of an optical signal due to the transmissive property. For example, PTL 2 discloses an optical transmission apparatus that adjusts an attenuation amount of a sub-carrier signal presented in an edge part of a super channel signal in order to suppress degradation of signal quality. Further, related techniques are also disclosed in PTLs 3 and 4.

CITATION LIST

Patent Literature

[PTL 1] International Publication No. WO 2012/051260
[PTL 2] Japanese Unexamined Patent Application Publication No. 2013-106328
[PTL 3] Japanese Unexamined Patent Application Publication No. 2016-220204
[PTL 4] Japanese Unexamined Patent Application Publication No. 2011-160162

SUMMARY OF INVENTION

Technical Problem

The WSS includes a port through which an optical signal is input and output, and is capable of setting which wavelength band of an optical signal is selectively input and output, for each port. Herein, the reduction of an optical spectrum described above is caused in a wavelength band of an optical signal that is input and output through each port of the WSS. Therefore, in order to improve signal quality more, an optical signal is conceivably controlled in consideration of a wavelength band in which each port of the WSS performs input and output, but the related-art techniques described above do not disclose such a method.

Solution to Problem

An optical transmission apparatus according to the present invention includes a transmitter configured to output an optical signal, and a multiplexing device configured to output a wavelength multiplexed optical signal including the optical signal being input from the transmitter. The multiplexing device includes: an input port being set in such a way as to allow a first wavelength band of an optical signal being input from the transmitter to pass therethrough; an intensity adjustment unit that is capable of adjusting an optical attenuation amount per predetermined wavelength band unit, and is configured to adjust an optical attenuation amount in an edge band of the first wavelength band of an optical signal passing through the input port to be smaller than an optical attenuation amount in a center band of the first wavelength band; and an output port configured to output a wavelength multiplexed optical signal including an optical signal having the optical attenuation amount being adjusted.

An optical transmission system according to the present invention includes a first optical transmission apparatus configured to output a wavelength multiplexed optical signal, and a second optical transmission apparatus configured to output a wavelength multiplexed optical signal. The first optical transmission apparatus includes a transmitter configured to output an optical signal, and a multiplexing device configured to output a wavelength multiplexed optical signal including an optical signal being input from the transmitter. The multiplexing device includes: an input port being set in such a way as to allow a first wavelength band of an optical signal being input from the transmitter to pass therethrough; an intensity adjustment unit that is capable of adjusting an optical attenuation amount per predetermined wavelength band unit, and is configured to adjust an optical attenuation amount in an edge band of the first wavelength band of an optical signal passing through the input port to be smaller than an optical attenuation amount in a center band of the first wavelength band; and an output port configured to output a wavelength multiplexed optical signal including an optical signal having the optical attenuation amount being adjusted.

An optical transmission method according to the present invention includes: allowing a first wavelength band of an input optical signal to pass through; adjusting an optical attenuation amount in an edge band of the first wavelength band to be smaller than an optical attenuation amount in a center band of the first wavelength band, for the optical signal passing through; and outputting a wavelength multiplexed optical signal including an optical signal having the optical attenuation amount being adjusted.

Advantageous Effects of Invention

According to the present invention, there can be provided the optical transmission apparatus, the optical communication system, and the optical communication method that adjust optical signal intensity in such a way as to suppress reduction of an optical spectrum being caused by transmission through the WSS.

BRIEF DESCRIPTION OF DRAWINGS

FIG. 3 is a diagram illustrating a configuration example of a multiplexing device according to the first example embodiment.

FIG. 6 is a diagram illustrating a configuration example of the multiplexing device according to the first example embodiment.

FIG. 14 is a flowchart describing an operation of the control device according to the third example embodiment.

FIG. 16 is a flowchart describing an operation of a control device according to the fourth example embodiment.

EXAMPLE EMBODIMENT

Now, with reference to the drawings, example embodiments of the present invention are described in detail. Note that the present example embodiments do not limit the disclosed technique. Further, the example embodiments described below may be combined as appropriate to an extent that contradiction is not caused.

First Example Embodiment

Figure 1:
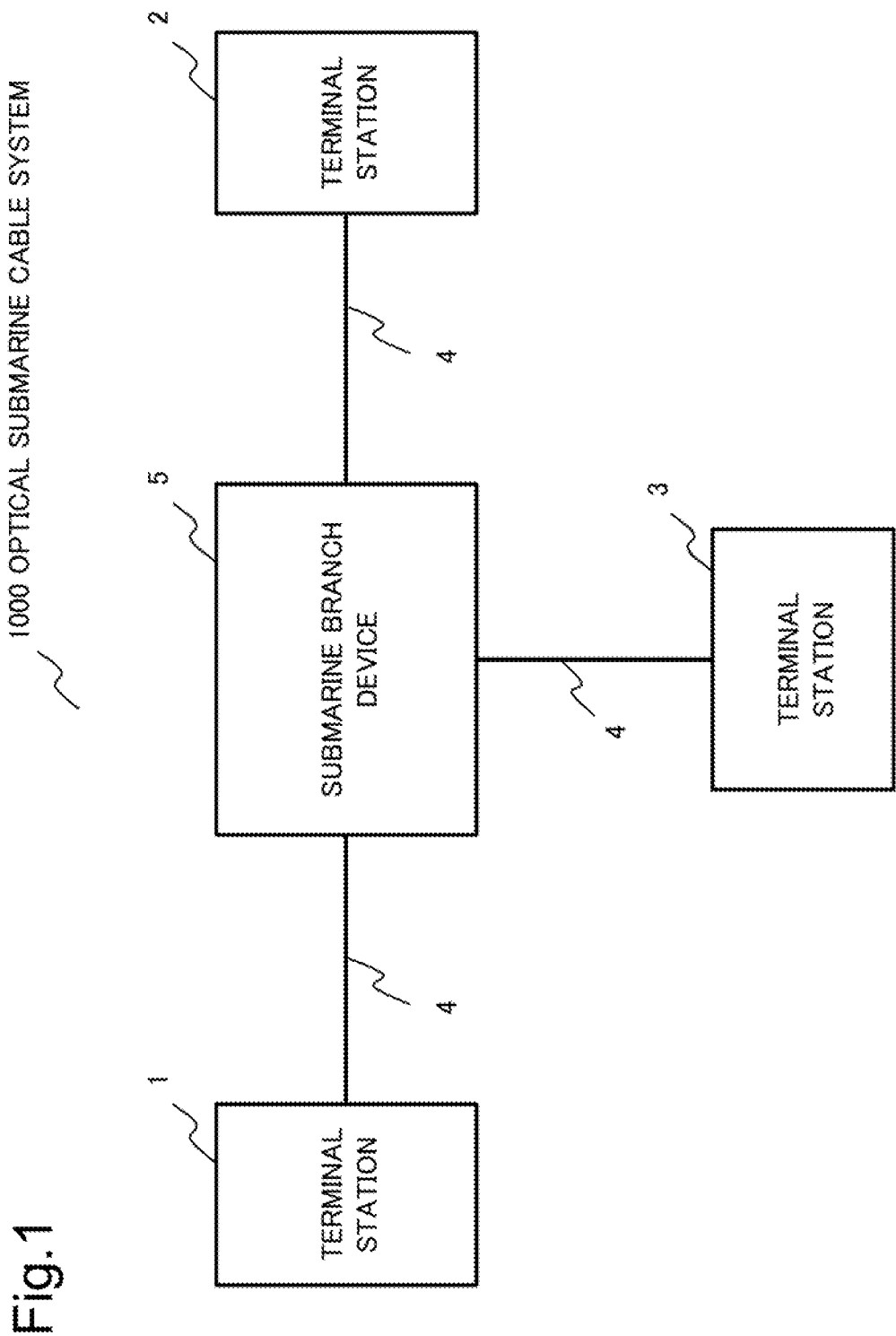
FIG. 1 is a diagram illustrating a configuration example of an optical submarine cable system according to a first example embodiment.

FIG. 1 is a diagram illustrating an example of an optical submarine cable system according to a first example embodiment of the present invention. An optical submarine cable system 1000 in FIG. 1 includes a terminal station 1, a terminal station 2, a terminal station 3, optical transmission paths 4, and a submarine branch device 5. The terminal station 1, the terminal station 2, the terminal station 3, and the submarine branch device 5 are connected with each other via the optical transmission paths 4. The terminal stations 1, 2, and 3 perform transmission of a WDM signal via the optical transmission paths 4. The submarine branch device 5 has a function of branching WDM signals, which are input from the terminal stations, per wavelength unit, and outputting the branched WDM signals.

Note that the configuration of the optical submarine cable system is not limited to that in FIG. 1. For example, a configuration in which the terminal station 3 and the submarine branch device 5 are not provided and the terminal station 1 and the terminal station 2 are connected with each other via an optical submarine cable is also conceivable. Further, the optical transmission paths 4 may be provided with an optical amplifier that amplifies an optical signal to be transmitted.

Figure 2:
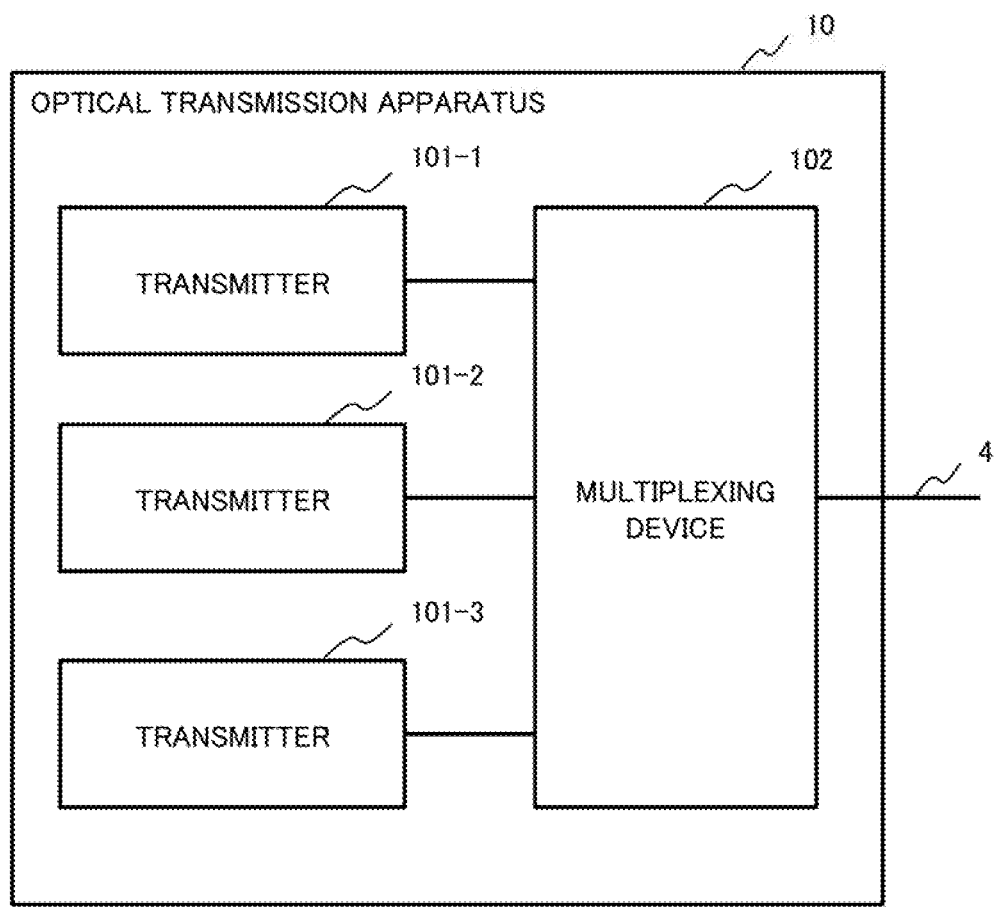
FIG. 2 is a diagram illustrating a configuration example of an optical transmission apparatus according to the first example embodiment.

The terminal stations 1, 2, and 3 are station houses installed on land, and each includes an optical transmission apparatus capable of transmitting an optical signal therein. FIG. 2 is a diagram illustrating a configuration example of an optical transmission apparatus. An optical transmission apparatus 10 illustrated in FIG. 2 includes transmitters 101 and a multiplexing device 102.

The transmitter 101 has a function of outputting an optical signal having a predetermined wavelength. For example, the transmitter 101 may be formed of a transponder. Further, the wavelength of the optical signal transmitted from the transmitter 101 may be changeable. Note that three transmitters 101-1, 101-2, and 101-3 are illustrated in FIG. 2, but the number of transmitters 101 is not limited to this.

The multiplexing device 102 outputs an optical signal input from the transmitter 101 as a wavelength multiplexed optical signal. FIG. 3 is a diagram illustrating a configuration example of the multiplexing device 102. According to FIG. 3, the multiplexing device 102 includes an input port 1021, an intensity adjustment unit 1022, and an output port 1023. Note that the multiplexing device 102 is formed of a WSS, for example.

Note that FIG. 3 illustrates a minimum configuration of the multiplexing device 102. When the optical transmission apparatus 10 includes a plurality of transmitters 101, the multiplexing device 102 includes at least the same number of input ports 1021 as the number of the plurality of transmitters 101. For example, as illustrated in FIG. 2, when the optical transmission apparatus 10 includes the three transmitters 101-1, 101-2, and 101-3, the multiplexing device 102 includes at least three input ports 1021.

The input port 1021 is connected with one of the transmitters 101, and causes an optical signal to be input from the transmitter 101. The input port 1021 is set in such a way as to allow a predetermined wavelength band to pass therethrough among optical signals input from the transmitter 101. The predetermined wavelength band that is allowed to pass through the input port 1021 is freely changeable, and is changeable through setting performed by an external control device or the like, which is not illustrated, for example.

The intensity adjustment unit 1022 is capable of adjusting an optical attenuation amount per unit of the predetermined wavelength band. Hereinafter, the unit of the predetermined wavelength band is referred to as a minimum resolution band. For example, the minimum resolution band is 3.125 GHz or 6.25 GHz.

The intensity adjustment unit 1022 may be achieved by a single or a plurality of variable optical attenuators.

Adjustment of an optical attenuation amount that is performed by the intensity adjustment unit 1022 is described. FIG. 4A to FIG. 4E are diagrams each illustrating a spectrum of an optical signal and an optical attenuation amount by the intensity adjustment unit 1022.

Figure 4A:
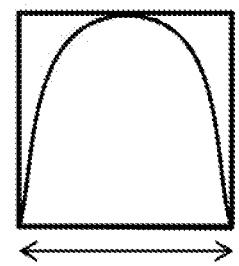
FIG. 4A is a diagram describing adjustment of an optical attenuation amount according to the first example embodiment.

FIG. 4A is a diagram illustrating an optical spectrum at a point (a) in FIG. 3, specifically, before an optical signal output from one of the transmitters 101 is input to the multiplexing device 102. The optical signal output from the transmitter 101 has a channel in a wavelength bandwidth indicated with a horizontal axis in FIG. 4A.

Figure 4B:
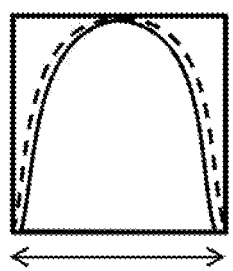
FIG. 4B is a diagram describing adjustment of an optical attenuation amount according to the first example embodiment.

Herein, it is assumed that a wavelength band indicated with a horizontal axis in FIG. 4B is set for the input port 1021 as the wavelength band that is allowed to pass therethrough. In this case, as illustrated in FIG. 4D, when a same optical attenuation amount is set for an entire channel of an optical signal and intensity adjustment is performed, reduction of an optical spectrum as illustrated in FIG. 4B is caused. Note that the wavelength band set for the input port 1021 is relevant to a wavelength band of an input optical signal. Specifically, the wavelength band set for the input port 1021 is a wavelength band equal to the wavelength band of the input optical signal or a wavelength band including the wavelength band of the input optical signal. Note that, as illustrated in FIG. 4D, when the same optical attenuation amount is set to the entire channel of the optical signal, the optical attenuation amount may be set to zero.

Figure 4C:
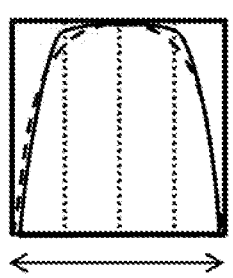
FIG. 4C is a diagram describing adjustment of an optical attenuation amount according to the first example embodiment.
Figure 4D:
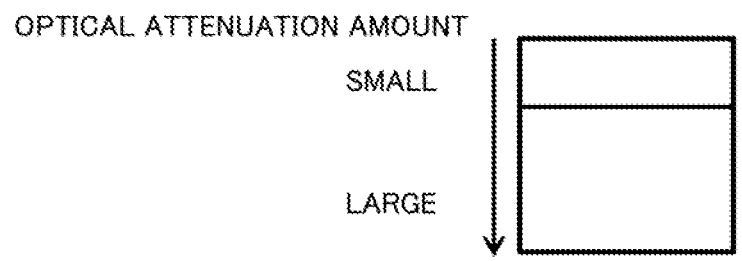
FIG. 4D is a diagram describing adjustment of an optical attenuation amount according to the first example embodiment.
Figure 4E:
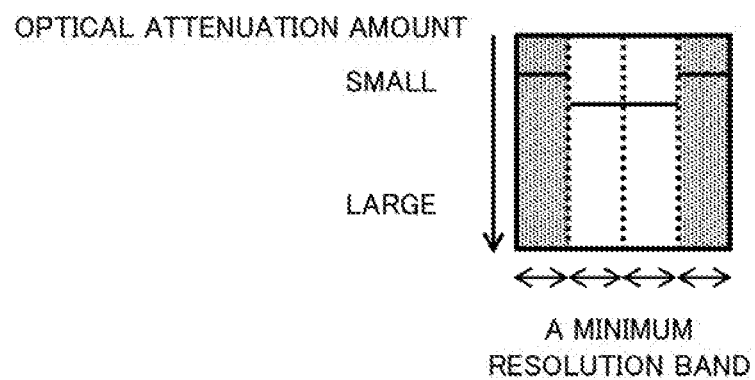
FIG. 4E is a diagram describing adjustment of an optical attenuation amount according to the first example embodiment.

In view of this, the intensity adjustment unit 1022 performs adjustment of an optical attenuation amount as illustrated in FIG. 4E. The intensity adjustment unit sets optical attenuation amounts to different values per minimum resolution band unit. A grid width illustrated in FIG. 4E indicates the minimum resolution band. Herein, wavelength bands positioned on both edges of the wavelength band set for the input port 1021 are referred to as edge bands, and a wavelength band positioned on an inner side of the edge bands is referred to as a center band. For example, the edge bands are minimum resolution bands positioned closest to the edges when the wavelength band set for the input port 1021 is divided by a minimum resolution band. The intensity adjustment unit 1022 adjusts in such a way that optical attenuation amounts in the edge bands are smaller than an optical attenuation amount in the center band. With this, as illustrated in FIG. 4C, reduction of an optical spectrum caused in a wavelength band that is set by a wavelength selection unit can be suppressed.

Figure 5A:
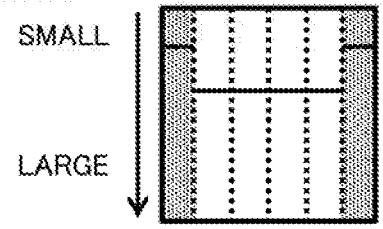
FIG. 5A is a diagram describing adjustment of an optical attenuation amount according to the first example embodiment.
Figure 5B:
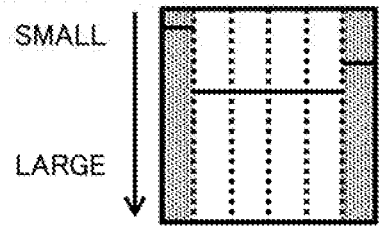
FIG. 5B is a diagram describing adjustment of an optical attenuation amount according to the first example embodiment.
Figure 5C:
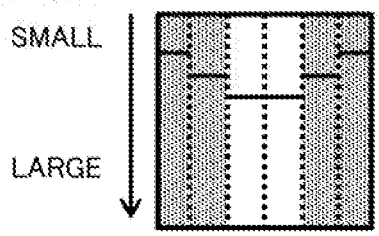
FIG. 5C is a diagram describing adjustment of an optical attenuation amount according to the first example embodiment.

Note that, for description, FIGS. 4C and 4E illustrate a case where the wavelength band that is allowed to pass through the input port 1021 is formed of four minimum resolution bands, but a relationship between the wavelength band that is allowed to pass through the input port 1021 and the minimum resolution bands is not limited this. For example, as illustrated in FIG. 5A, the wavelength band that is allowed to pass through the input port 1021 may be formed of six minimum resolution bands. Further, as illustrated in FIG. 5B, attenuation amounts may be adjusted to be different from each other in the edge bands on both the edges. Further, as illustrated in FIG. 5C, the edge band is not limited to one minimum resolution band, and a plurality of minimum resolution bands from the edge may be subjected to adjustment. In this case, adjustment may be made in such a way that an optical attenuation amount is reduced in a stepwise manner as approaching the edge.

Figure 7A:
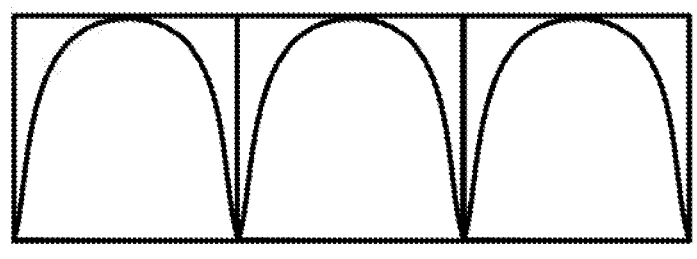
FIG. 7A is a diagram describing adjustment of an optical attenuation amount according to the first example embodiment.
Figure 7B:
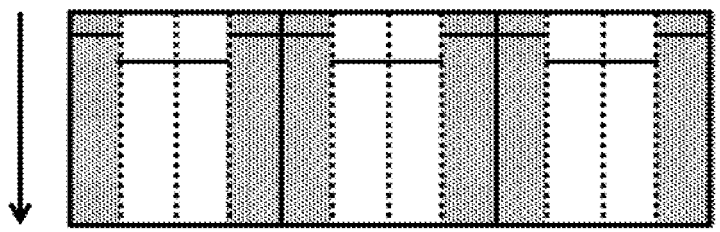
FIG. 7B is a diagram describing adjustment of an optical attenuation amount according to the first example embodiment.

Note that the multiplexing device 102 may include a plurality of input ports 1021. FIG. 6 is a diagram illustrating a configuration example of a multiplexing device including a plurality of input ports. For example, an input port 1021-1 is connected with the transmitter 101-1, an input port 1021-2 is connected with the transmitter 101-2, and an input port 1021-3 is connected with the transmitter 101-3. For each of the input ports 1021, a wavelength band that is allowed to pass therethrough is set. Herein, it is desired that the wavelength bands set for the input ports 1021 be different from each other. FIGS. 7A and 7B are diagrams describing a case where an optical attenuation amount is adjusted for each of the plurality of input ports. As illustrated in FIGS. 7A and 7B, the intensity adjustment unit 1022 performs the adjustment of the optical attenuation amount described above with respect to the wavelength band set for each of the input ports.

The output port 1023 outputs the optical signal subjected to intensity adjustment to the optical transmission path 4. Note that as illustrated in FIG. 6, when a plurality of optical signals are input to the multiplexing device 102, a function of multiplexing the plurality of optical signals and outputting the multiplexed signal as a wavelength multiplexed optical signal is provided.

With the optical transmission apparatus according to the first example embodiment of the present invention, in the wavelength band that is set for the input port of the multiplexing device, the optical attenuation amounts in the edge bands are adjusted to be smaller than the optical attenuation amount in the center band. With this, optical intensity of the optical spectrum at both the edges can be compensated, and the reduction of the optical spectrum caused in the wavelength band that is allowed to pass through the input port can be suppressed.

Second Example Embodiment

Figure 8:
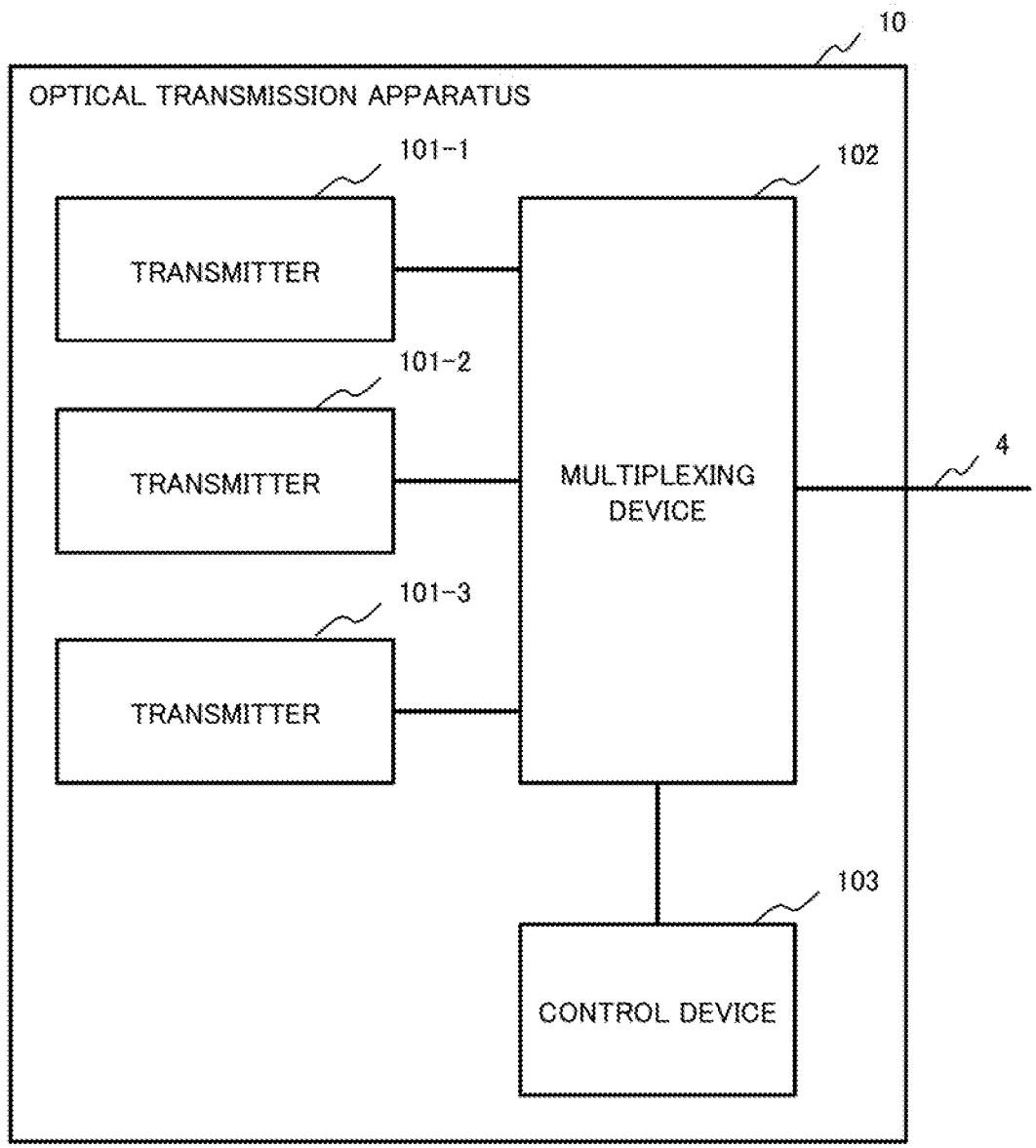
FIG. 8 is a diagram illustrating a configuration example of an optical transmission apparatus according to a second example embodiment.
Figure 9:
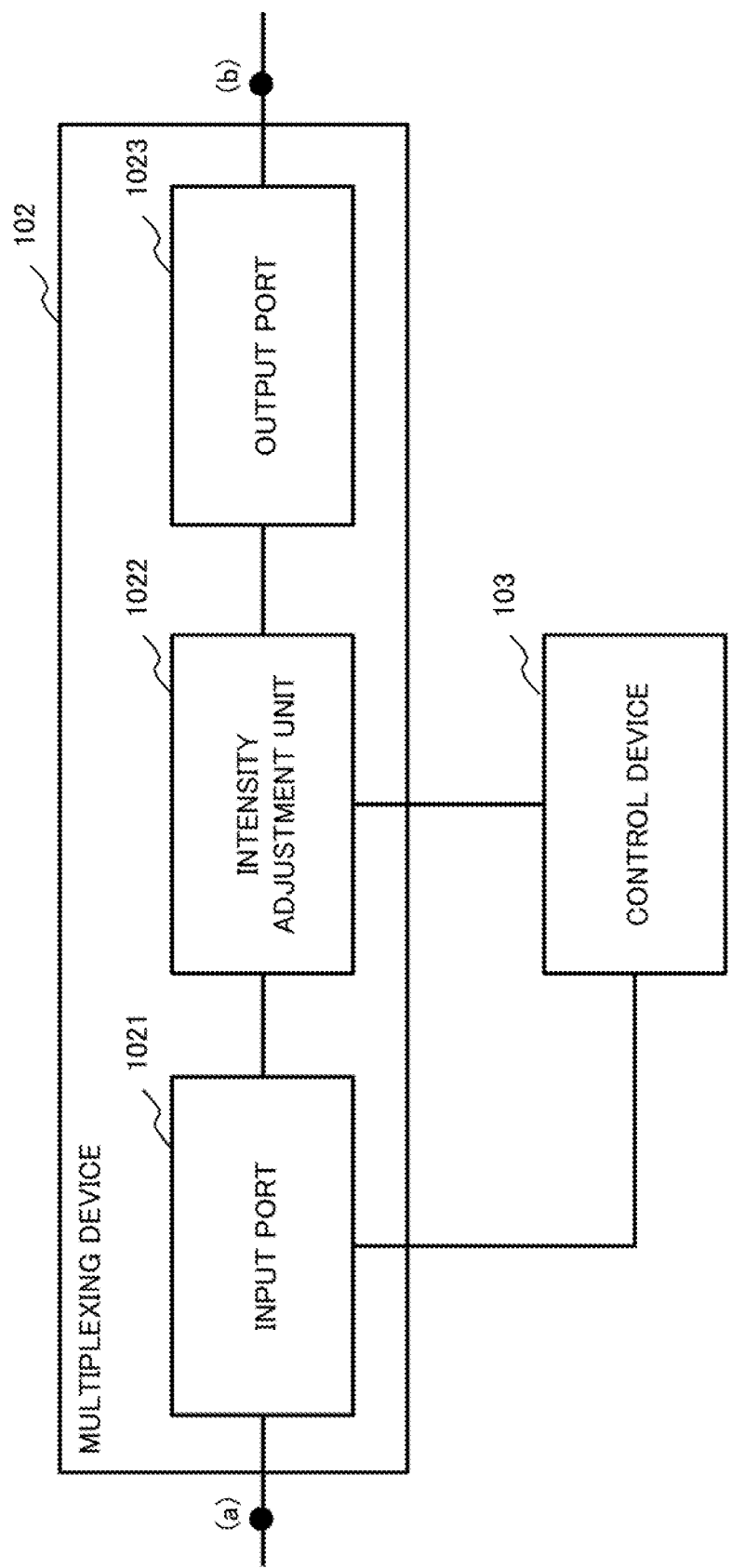
FIG. 9 is a diagram illustrating a configuration example of a multiplexing device and a control device according to the second example embodiment.

The adjustment of the optical attenuation amount described in the first example embodiment may be performed by an instruction from a control device included in the optical transmission apparatus. FIG. 8 is a diagram illustrating a configuration example of an optical transmission apparatus 10 according to a second example embodiment. The optical transmission apparatus 10 in FIG. 9 is characterized by including a control device 103 as compared to the optical transmission apparatus 10 in FIG. 2.

The control device 103 is capable of controlling a multiplexing device 102. By using FIG. 9, control of the multiplexing device 102 that is performed by the control device 103 is described.

The control device 103 specifies a wavelength band set for an input port 1021. Herein, the control device 103 may specify the wavelength band set for the input port 1021 by referring to a control unit, which is not illustrated, included in the multiplexing device 102. Further, the control device 103 may have a function of setting a wavelength band that is allowed to pass through the input port 1021. In this case, the control device 103 stores setting information for the input port 1021, and is capable of specifying the wavelength band set for the input port 1021 by referring to the stored setting information.

Note that the control device 103 may specify the input port 1021 that is set to a predetermined wavelength grid unit. The predetermined wavelength grid unit is, for example, a wavelength grid equivalent to a minimum resolution band. As illustrated in FIG. 6, when the multiplexing device 102 includes a plurality of input ports 1021, the control device 103 may specify a wavelength band set for each of the input ports 1021 by specifying wavelength grids as edges, the wavelength grids being set for the input ports 1021 with different adjacent wavelength grids.

The control device 103 instructs optical attenuation amounts to the intensity adjustment unit 1022. Specifically, an optical attenuation amount is instructed for each of the edge bands and the center band in the wavelength band set for the input port 1021.

Figure 10:
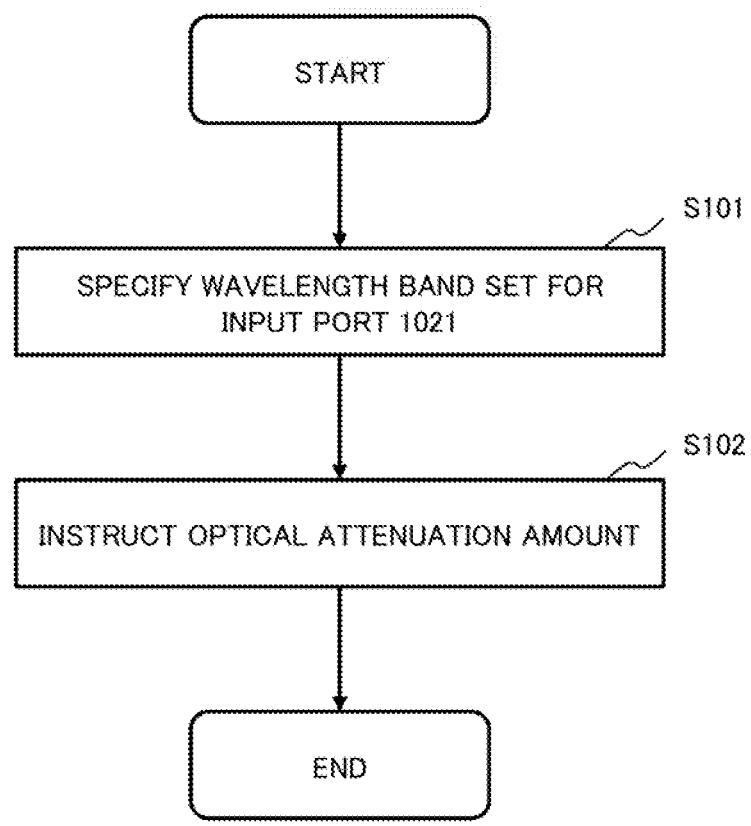
FIG. 10 is a flowchart describing an operation of the control device according to the second example embodiment.

The control operation of the multiplexing device 102 that is performed by the control device 103 is described by using a flowchart illustrated in FIG. 10.

First, the control device 103 specifies the wavelength band set for the input port 1021 (S101).

Subsequently, the control device 103 instructs the optical attenuation amount for each of the edge bands and the center band in the specified wavelength band (S102).

Figure 11:
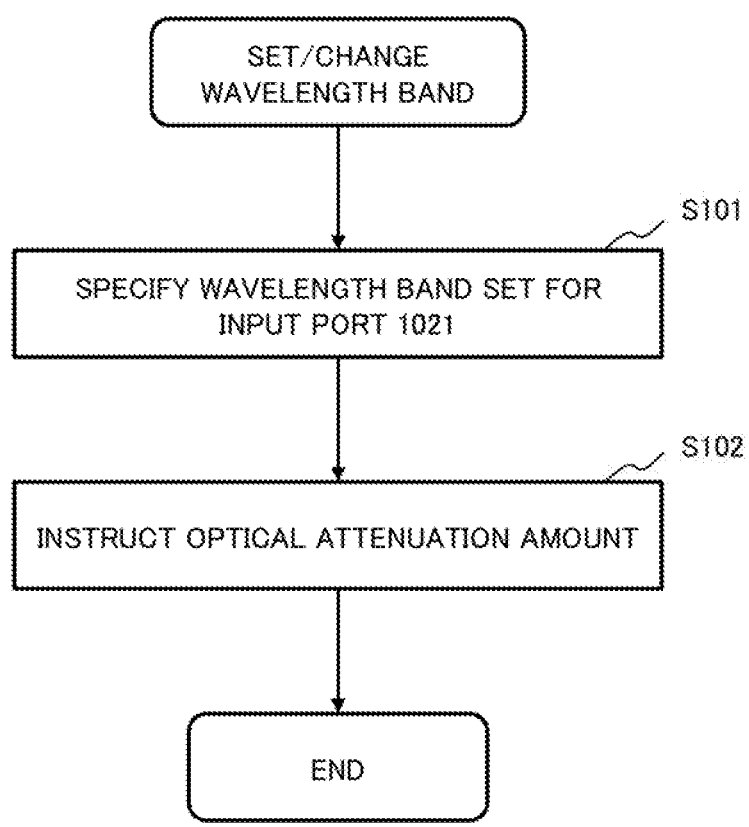
FIG. 11 is a flowchart describing an operation of the control device according to the second example embodiment.

Note that, as described above, the control device 103 may have a function of setting a wavelength band for the input port 1021. In this case, as illustrated in a flowchart in FIG. 11, the control described above may be started in response to that the control device 103 sets the wavelength band for the input port 1021 or changes setting.

With the optical transmission apparatus according to the second example embodiment of the present invention, in the wavelength band that is set for the input port of the multiplexing device, the optical attenuation amounts in the edge bands are adjusted to be smaller than the optical attenuation amount in the center band. With this, optical intensity of the optical spectrum at both edges can be compensated, and the reduction of the optical spectrum caused in the wavelength band that is allowed to pass through the input port can be suppressed.

Third Example Embodiment

Figure 12:
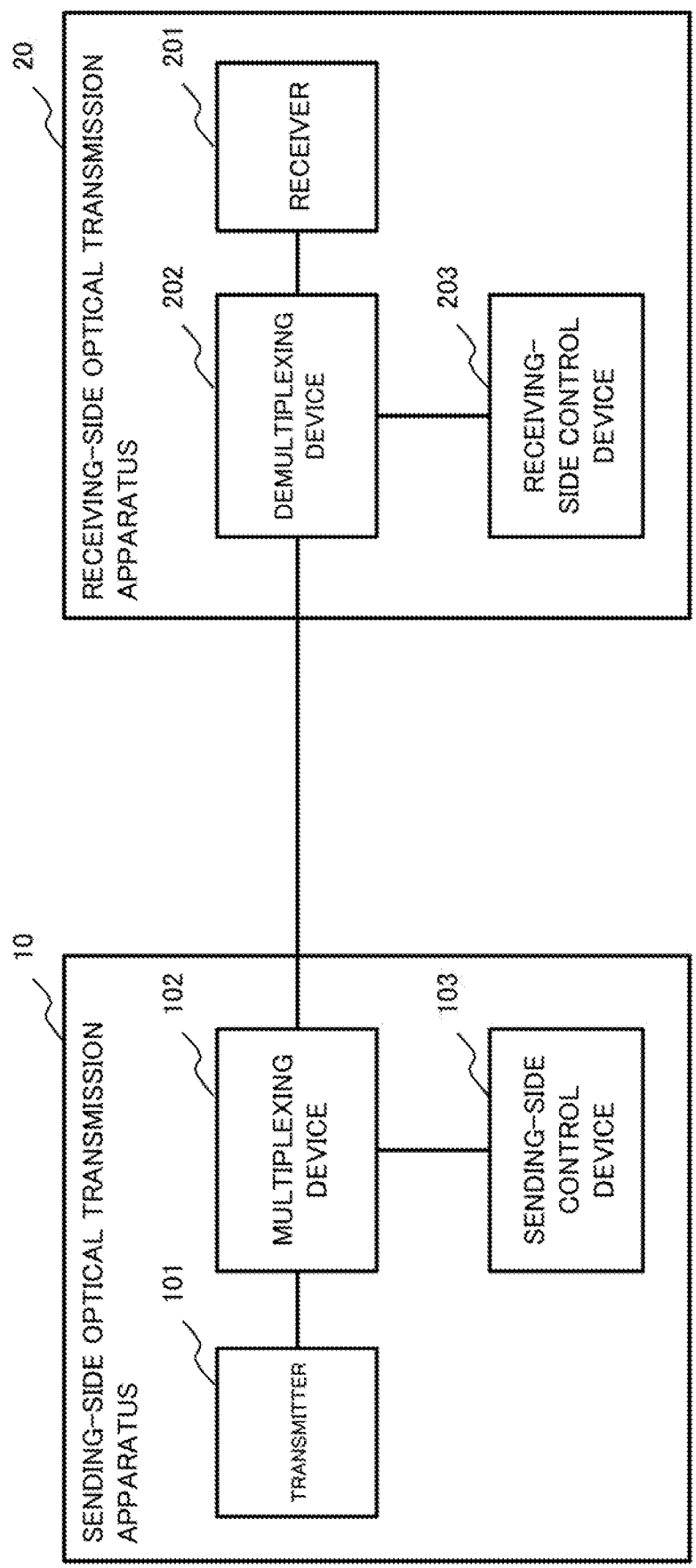
FIG. 12 is a diagram illustrating configuration examples of optical transmission apparatus according to a third example embodiment.

The adjustment of the optical attenuation amount described in the above example embodiments may be performed based on signal quality. FIG. 12 is a diagram illustrating configuration examples of optical transmission apparatus according to a third example embodiment. According to FIG. 12, a sending-side optical transmission apparatus 10 and a receiving-side optical transmission apparatus 20 include control devices 103 and 203, respectively. Note that, for example, the sending-side optical transmission apparatus 10 is provided inside the terminal station 1 in FIG. 1, and the receiving-side optical transmission apparatus 20 is provided inside the terminal station 2 as a counterpart.

A sending-side control device 103 instructs optical attenuation amounts to the multiplexing device 102, based on a monitoring result of signal quality of an optical signal. Specifically, the sending-side control device 103 monitors a BER or a Q factor indicating signal quality of an optical signal. Herein, the sending-side control device 103 may receive a monitoring result of signal quality from a receiving-side control device 203. Communication between the sending-side control device 103 and the receiving-side control device 203 may be performed via the optical transmission path 4, or may be performed via an external network.

Figure 13:
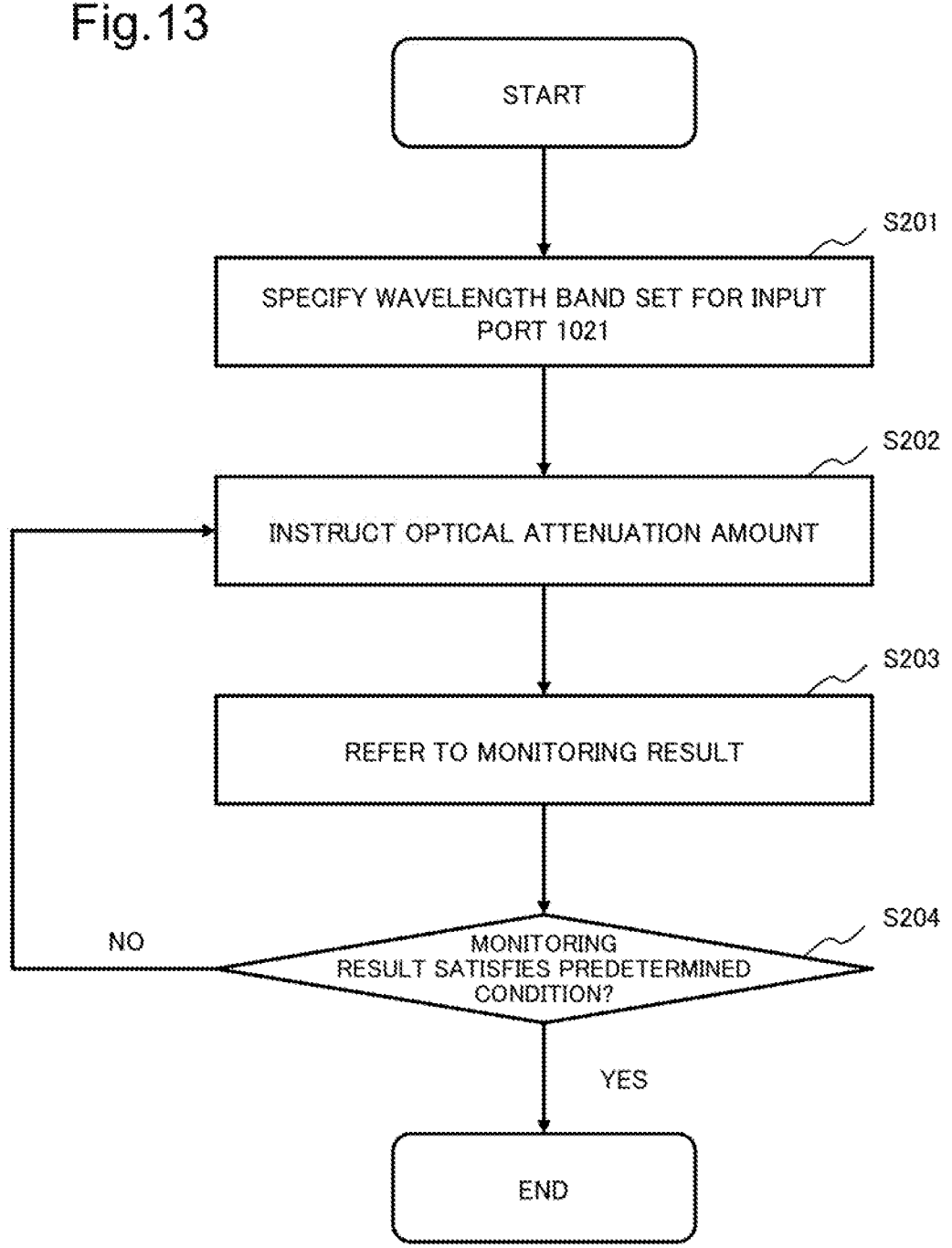
FIG. 13 is a flowchart describing an operation of a control device according to the third example embodiment.

By using FIG. 13, a control operation performed by the sending-side control device 103 is described. Control is performed based on a monitoring result of signal quality, which is different from the control example described with FIG. 10.

S201 and S202 are similar to S101 and S102 in FIG. 10, thus detailed description therefor is omitted.

The sending-side control device 103 refers to a signal quality monitoring result of an optical signal subjected to optical attenuation amount adjustment (S203).

The sending-side control device 103 determines whether the signal quality monitoring result satisfies a predetermined condition (S204). When the predetermined condition is satisfied (YES in S204), the control is terminated. When the predetermined condition is not satisfied (NO in S204), the procedure returns to S202 again, and an instruction of optical attenuation amounts is given. Herein, the predetermined condition may refer to a state in which a bit error rate (BER) or a quality factor (Q factor) indicating signal quality satisfies a predetermined threshold value. Alternatively, the predetermined condition may refer to a state in which signal quality after adjustment of optical attenuation amount is not improved from signal quality before the adjustment. In this case, an optical attenuation amount set before the adjustment of optical attenuation amount is determined to be an optimized optical attenuation amount.

Note that the optical attenuation amount given as an instruction when the procedure returns to S202 again is an optical attenuation amount different from the optical attenuation amount that has been already given as an instruction. Herein, the different optical attenuation amount may be acquired by changing the optical attenuation amount, which has been already given as an instruction, in such a way as to satisfy the predetermined condition.

Further, the sending-side control device 103 may control the optical attenuation amount by recording the signal quality monitoring result relevant to the optical attenuation amount. By using FIG. 14, a control operation performed by the sending-side control device 103 is described. As compared to FIG. 13, the sending-side control device 103 performs an operation from S205 to 207 in place of S203 and S204.

The sending-side control device 103 records the signal quality monitoring result that is acquired as a result of adjustment of the optical attenuation amount (S205).

The sending-side control device 103 determines whether recording of the monitoring result is terminated (S206). When termination is not performed (NO in S206), the procedure returns to S202 again. Note that the sending-side control device 103 may perform control in such a way as to perform adjustment per predetermined attenuation amount unit, as an instruction of an optical attenuation amount, which is performed in S202. Therefore, by repeating S202, signal quality at the time of adjusting the optical attenuation amount per predetermined attenuation amount unit can be recorded. Herein, the predetermined attenuation amount unit may be a variable minimum amount of the optical attenuation amount of the intensity adjustment unit 1022 or an integral multiple thereof.

When it is determined that recording of the monitoring result is terminated (YES in S206), the sending-side control device 103 specifies an optimal optical attenuation amount (S207). Herein, the sending-side control device 103 may specify an optical attenuation amount when the signal quality indicates a highest value among the recorded signal qualities, as the optimal optical attenuation amount.

With the optical transmission apparatus according to the third example embodiment of the present invention, in the wavelength band that is set for the input port of the multiplexing device, the optical attenuation amounts in the edge bands are adjusted to be smaller than the optical attenuation amount in the center band. With this, optical intensity of the optical spectrum at both edges can be compensated, and the reduction of the optical spectrum caused in the wavelength band that is allowed to pass through the input port can be suppressed. Further, with the optical transmission apparatus according to the third example embodiment of the present invention, the control device controls the multiplexing device, based on the monitoring result of signal quality, and thus the adjustment of the optical attenuation amount that improves signal quality is enabled.

Fourth Example Embodiment

An optical transmission apparatus according to a fourth example embodiment of the present invention performs the adjustment of the optical attenuation amount described in the example embodiments described above, based on a property inverse to the transmissive property of the multiplexing device. A configuration example of the optical transmission apparatus is similar to the configuration described in the example embodiments described above.

FIGS. 15A to 15E are diagrams describing the adjustment of the optical attenuation amount performed by the intensity adjustment unit 1022, based on the property inverse to the property of the multiplexing device 102.

Figure 15A:
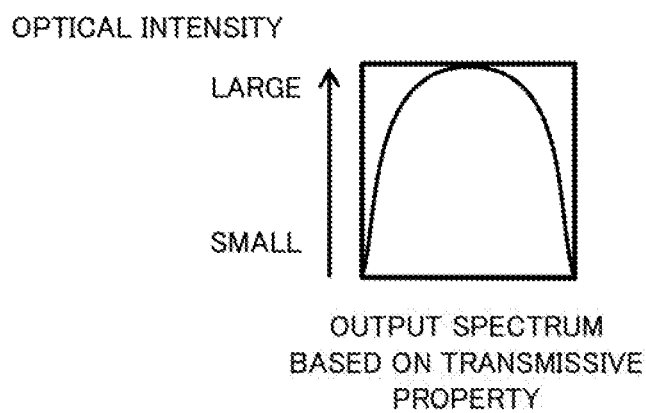
FIG. 15A is a diagram describing adjustment of an optical attenuation amount according to a fourth example embodiment.
Figure 15B:
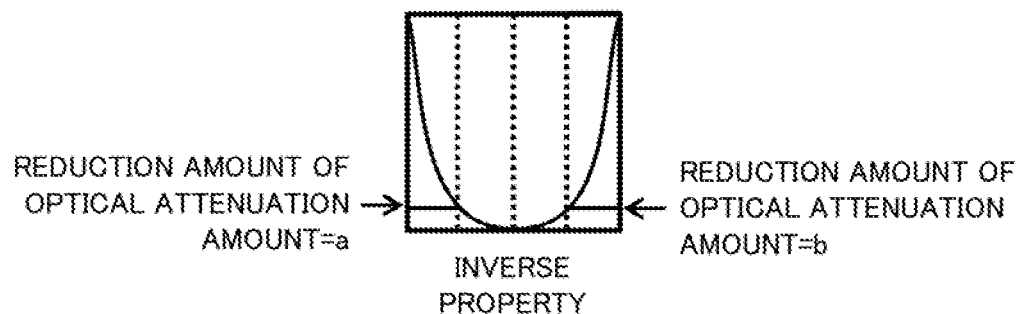
FIG. 15B is a diagram describing adjustment of an optical attenuation amount according to the fourth example embodiment.

FIG. 15A illustrates an output spectrum of an optical signal based on the transmissive property of the multiplexing device 102. The output spectrum is derived from the wavelength band set for the input port 1021 and the transmissive property of the multiplexing device. FIG. 15B is a diagram illustrating the inverse property derived from the output spectrum illustrated in FIG. 15A, and FIG. 15D is a diagram illustrating an optical attenuation amount based on the inverse property. As illustrated in FIG. 15D, the intensity adjustment unit 1022 sets a value, which is acquired by multiplying, with a variable, a reduction amount of an optical attenuation amount in an edge band that is derived from the inverse property, as an optical attenuation amount in the edge band.

Figure 15C:
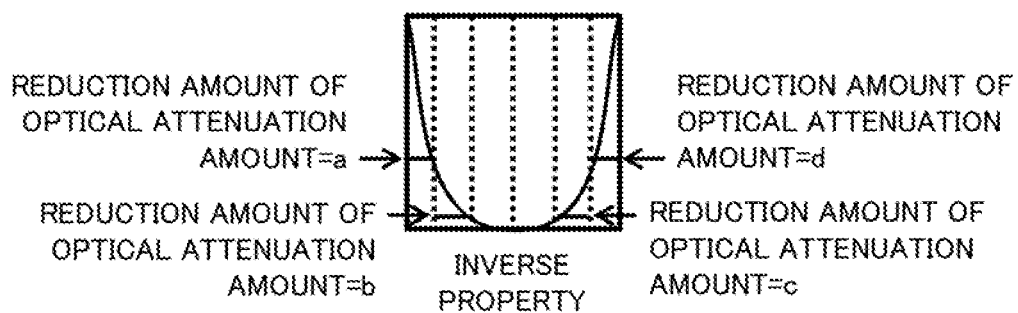
FIG. 15C is a diagram describing adjustment of an optical attenuation amount according to the fourth example embodiment.
Figure 15D:
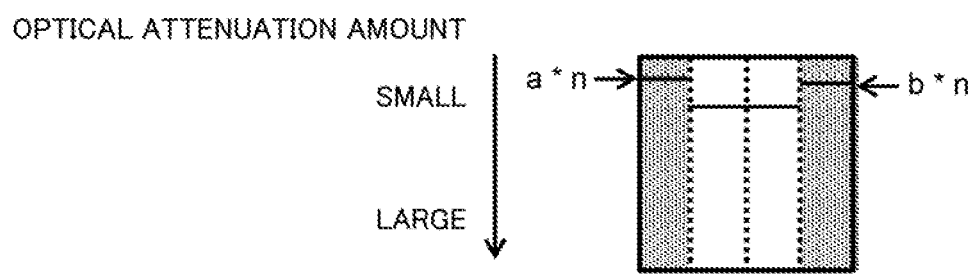
FIG. 15D is a diagram describing adjustment of an optical attenuation amount according to the fourth example embodiment.
Figure 15E:
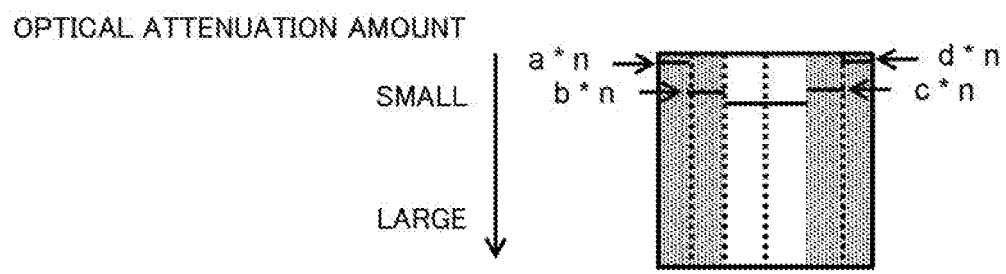
FIG. 15E is a diagram describing adjustment of an optical attenuation amount according to the fourth example embodiment.

Note that, as illustrated in FIGS. 15C and 15E, a plurality of minimum resolution bands may be edge bands to be subjected to adjustment of an optical attenuation amount.

Herein, the adjustment of the optical attenuation amount described above may be performed by the control device 103 controlling the multiplexing device 102. FIG. 16 is a flowchart describing an operation in which the control device 103 adjusts an optical attenuation amount, based on the inverse property.

The control device 103 specifies the wavelength band set for the input port 1021 (S301).

The control device 103 determines an optical attenuation amount, based on the specified wavelength band and the property inverse to the transmissive property of the multiplexing device 102 (S302). Note that the control device 103 may be capable of storing information relating to the transmissive property of the multiplexing device 102, and in this case, the optical attenuation amount illustrated in FIG. 15D can be determined based on the stored information.

According to the configuration of the present example embodiment, in the wavelength band set for the input port of the multiplexing device, adjustment is performed in such a way that the optical attenuation amounts in the edge bands are smaller than the optical attenuation amount in the center band. With this, optical intensity of the optical spectrum at both the edges can be compensated, and the reduction of the optical spectrum caused in the wavelength band that is allowed to pass through the input port can be suppressed. Further, the optical transmission apparatus according to the fourth example embodiment of the present invention performs control, based on the property inverse to the transmissive property of the multiplexing device, and thus an optical attenuation amount to be adjusted can be determined even when a reception property cannot be monitored.

Fifth Example Embodiment

Figure 17:
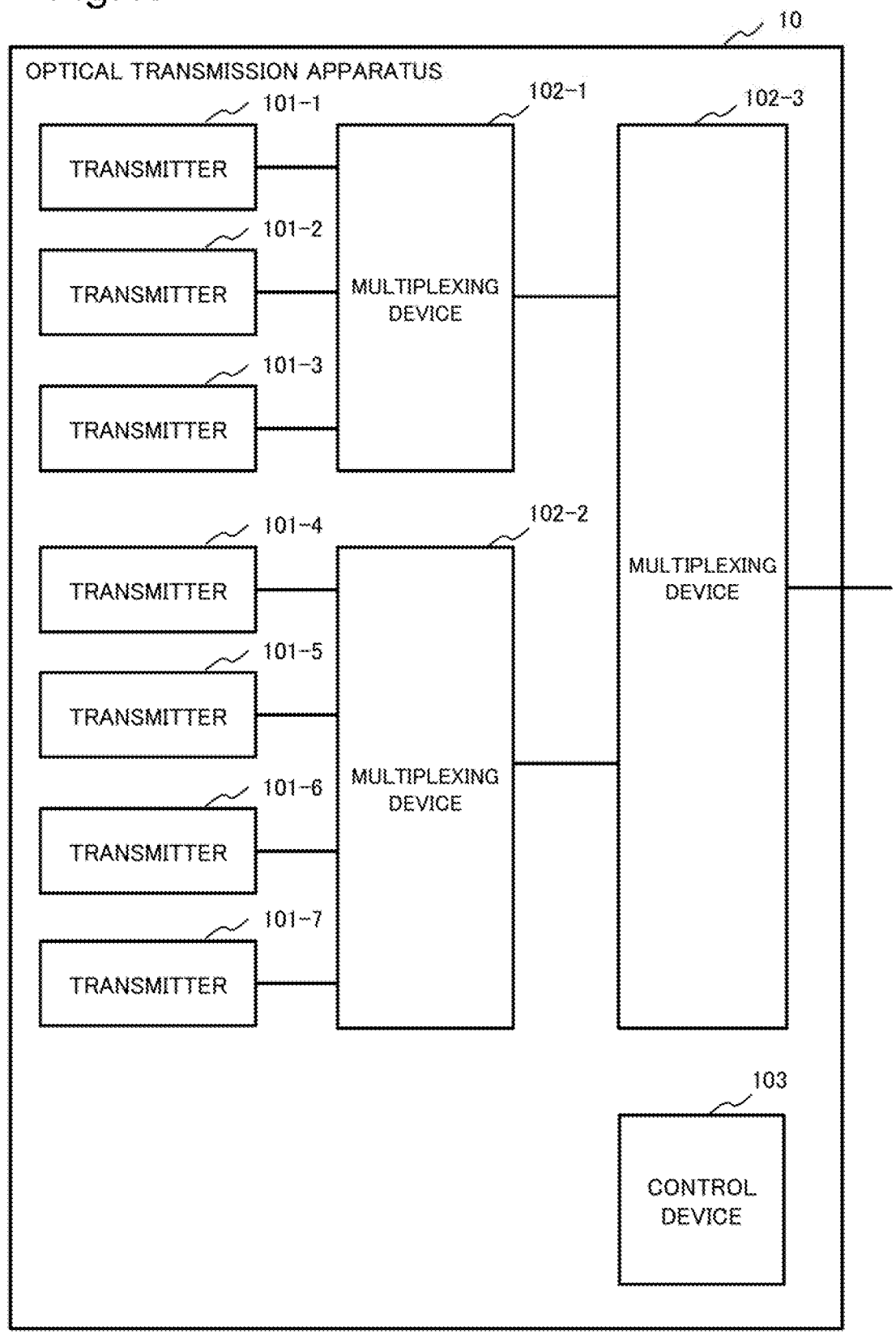
FIG. 17 is a diagram illustrating a configuration example of an optical transmission apparatus according to a fifth example embodiment.

An optical transmission apparatus is capable of controlling an optical attenuation amount even when a plurality of multiplexing devices are included in a multi-stage manner. FIG. 17 is a diagram illustrating a configuration example of an optical transmission apparatus according to a fifth example embodiment. The optical transmission apparatus 10 is different from the example embodiments described above in that a plurality of multiplexing devices 102 are included.

The multiplexing devices 102-1 and 102-2 are each connected with the plurality of transmitters 101. Similarly to the example embodiments described above, the multiplexing devices 102-1 and 102-2 each output a wavelength multiplexed optical signal including an optical signal input from the transmitter 101. Note that the number of transmitters to be connected with the multiplexing devices 102-1 and 102-2 is not limited to the number illustrated in FIG. 17.

The multiplexing device 102-3 multiplexes the wavelength multiplexed optical signals input from the multiplexing devices 102-1 and 102-2, and outputs the multiplexed signal. A configuration of the multiplexing device 102-3 is similar to that of the multiplexing device 102 described in the example embodiments described above, and hence description therefor is omitted.

The control device 103 is configured to be capable of controlling the plurality of multiplexing devices 102. The control described in the example embodiments described above is applicable to control of an optical attenuation amount for each of the multiplexing devices 102, which is performed by the control device 103.

Figure 18A:
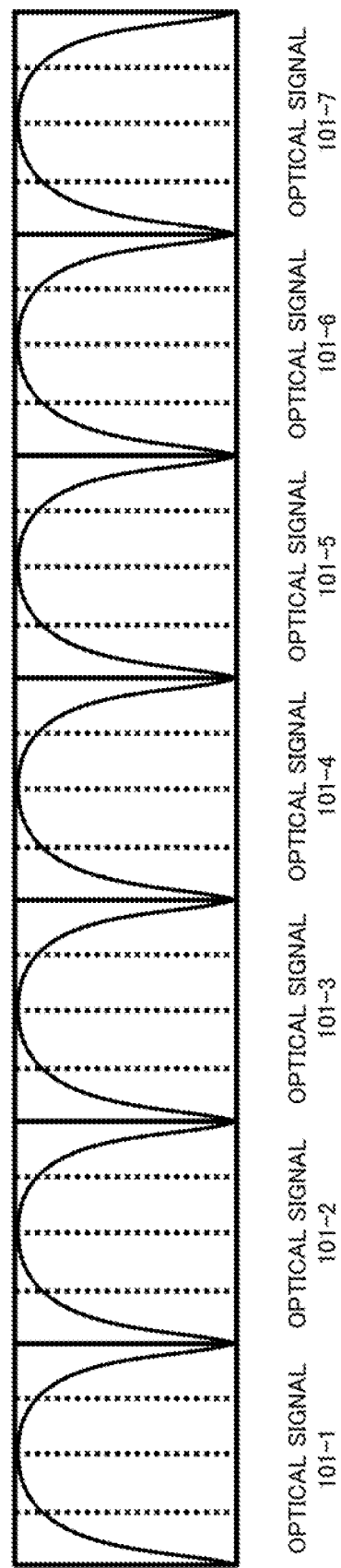
FIG. 18A is a diagram describing adjustment of an optical attenuation amount according to the fifth example embodiment.
Figure 18B:
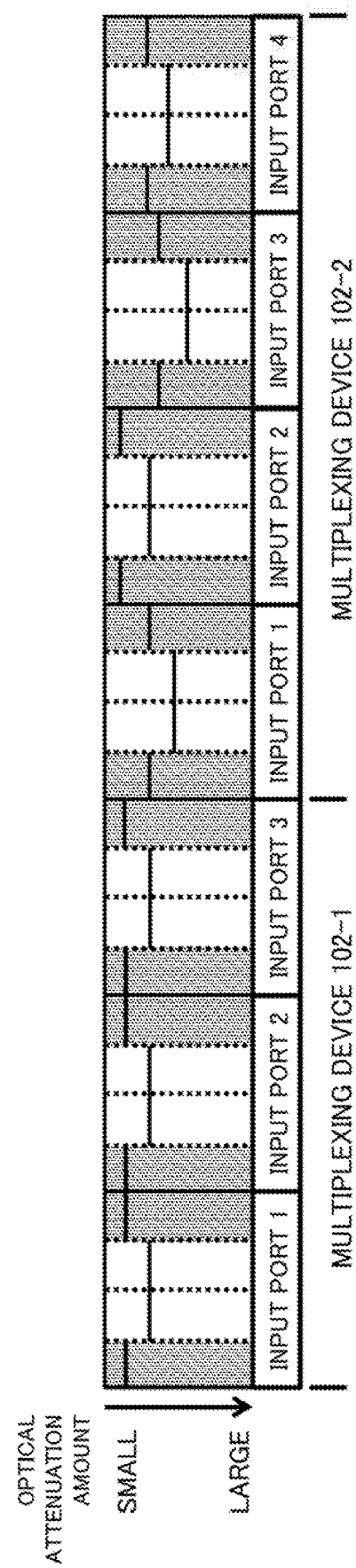
FIG. 18B is a diagram describing adjustment of an optical attenuation amount according to the fifth example embodiment.
Figure 18C:
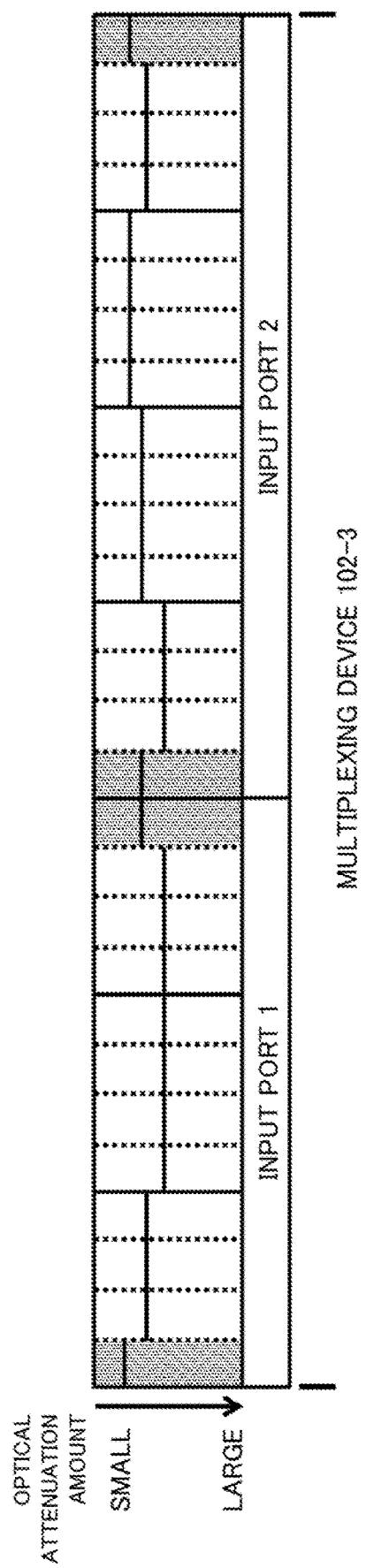
FIG. 18C is a diagram describing adjustment of an optical attenuation amount according to the fifth example embodiment.

FIGS. 18A, 18B, and 18C are diagrams illustrating adjustment of optical attenuation amounts for the multiplexing devices. According to FIGS. 18A, 18B, and 18C, for wavelength bands set for input ports included in each of the multiplexing devices, control is performed in a such way that the optical attenuation amounts in the edge bands are smaller than the optical attenuation amount in the center band. Note that the wavelength bands set for the input ports of the multiplexing devices 102-1 and 102-2 are wavelength bands that are different from each other.

Note that the adjustment of the optical attenuation amounts is not limited to those illustrated in FIGS. 18A, 18B, and 18C. For example, for the minimum resolution band relevant to the edge band set for the input port of the multiplexing device 102-3, optical attenuation amounts may be adjusted in the multiplexing devices 102-1 and 102-2. In this case, the adjustment of the optical attenuation amount in the multiplexing device 102-3 is not required. Alternatively, for the minimum resolution bands relevant to the edge bands in the wavelength band set for each of the input ports of the multiplexing devices 102-1 and 102-2, an optical attenuation amount may be adjusted in the multiplexing device 102-3.

According to the configuration of the present example embodiment, in the wavelength band set for the input port of the multiplexing device, adjustment is performed in such a way that the optical attenuation amounts in the edge bands are smaller than the optical attenuation amount in the center band. With this, optical intensity of the optical spectrum at both edges can be compensated, and the reduction of the optical spectrum caused in the wavelength band that is allowed to pass through the input port can be suppressed. Further, the optical transmission apparatus according to the fifth example embodiment of the present invention is capable of adjusting an optical attenuation amount even when the optical transmission apparatus includes a plurality of multiplexing devices and the plurality of multiplexing devices are further provided in a multi-stage manner.

Sixth Example Embodiment

Figure 19:
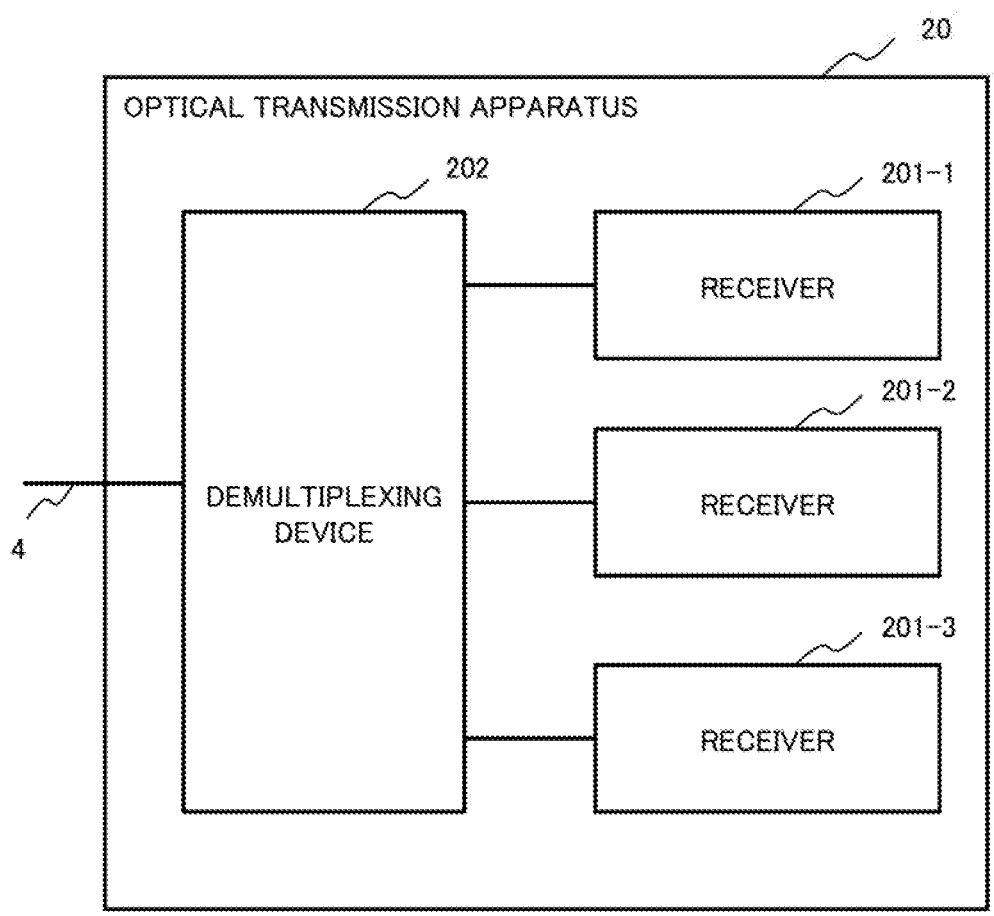
FIG. 19 is a diagram illustrating a configuration example of an optical transmission apparatus according to a sixth example embodiment.

In the example embodiments described above, the configuration of the sending-side optical transmission apparatus has been described, but the configuration described in the example embodiments described above is also similarly applicable to a receiving-side optical transmission apparatus. FIG. 19 illustrates a configuration example of a receiving-side optical transmission apparatus.

Figure 20:
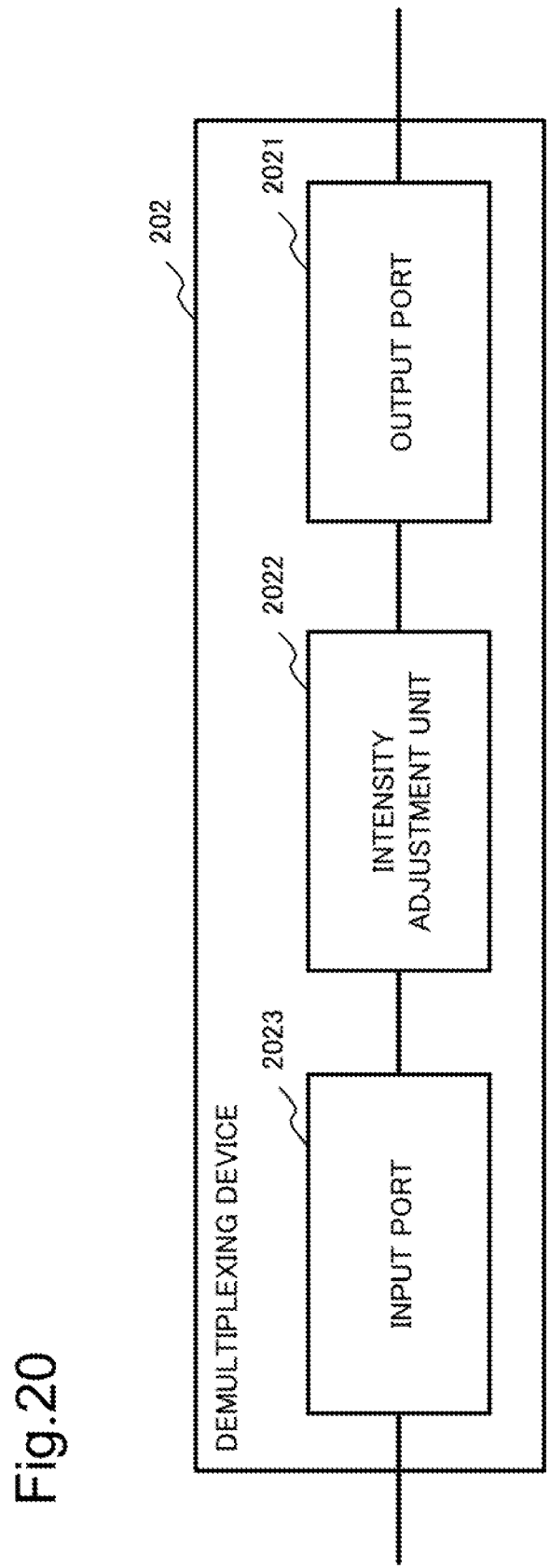
FIG. 20 is a diagram illustrating a configuration example of a demultiplexing device according to the sixth example embodiment.

A demultiplexing device 202 demultiplexes a wavelength multiplexed optical signal input from the optical transmission path 4, and outputs the optical signals to receivers 201. FIG. 20 illustrates a configuration example of the demultiplexing device 202.

An output port 2021 has a function similar to that of the input port 1021 in FIG. 3. The output port 2021 is connected with one of the receivers 201. The output port 2021 is set to allow a predetermined wavelength band to pass therethrough for an optical signal to be output to the receiver 201.

Note that FIG. 20 illustrates a minimum configuration of the demultiplexing device 202. When the optical transmission apparatus 20 includes the plurality of receivers 201, the demultiplexing device 202 includes at least the same number of output ports 2021 as the number of the plurality of receivers 101. For example, as illustrated in FIG. 19, when the optical transmission apparatus 20 includes three receivers 201-1, 201-2, and 201-3, the demultiplexing device 202 includes at least three output ports 2021.

An intensity adjustment unit 2022 has a function similar to that of the intensity adjustment unit 1022 in FIG. 3.

An input port 2023 has a function similar to that of the output port 1023 in FIG. 3. The input port 2023 outputs a wavelength multiplexed optical signal, which is input from the optical transmission path 4, to the intensity adjustment unit 2022.

According to the configuration of the present example embodiment, in the wavelength band set for the output port of the demultiplexing device, adjustment is performed in such a way that the optical attenuation amounts in the edge bands are smaller than the optical attenuation amount in the center band. With this, optical intensity of the optical spectrum at both edges can be compensated, and the reduction of the optical spectrum caused in the wavelength band that is allowed to pass through the output port can be suppressed.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2018-060464, filed on Mar. 27, 2018, the disclosure of which is incorporated herein in its entirety by reference.

REFERENCE SIGNS LIST 1, 2, 3 Terminal station
4 Optical transmission path
5 Submarine branch device
10, 20 Optical transmission apparatus
101 Transmitter
201 Receiver
102 Multiplexing device
202 Demultiplexing device
103, 203 Control device
1021 Input port
1022 Intensity adjustment unit
1023 Output port
2021 Output port
2022 Intensity adjustment unit 2023 Input port
1000 Optical submarine cable system

The invention claimed is:

1. An optical transmission apparatus, comprising:
a transmitter configured to output an optical signal, the optical signal being a single channel signal; and
a multiplexer configured to output a wavelength multiplexed optical signal including the optical signal from the transmitter, wherein
the multiplexer includes:
an input portion configured to filter the optical signal, the filtered optical signal comprising a pass through wavelength band;
an intensity adjuster configured to attenuate the filtered optical signal by adjusting a first optical attenuation amount to be smaller than a second optical attenuation amount, the first optical attenuation amount corresponding to an edge band in the pass through wavelength band, the second optical attenuation amount corresponding to a center band in the pass through wavelength band; and
an output port configured to output—the wavelength multiplexed signal including the attenuated optical signal.

2. The optical transmission apparatus according to claim 1, further comprising
a controller-being capable of controlling the multiplexer, wherein
the controller-specifies the edge band, and instructs the first optical attenuation amount in the edge band.

3. The optical transmission apparatus according to claim 2, wherein
the controller is capable of setting a wavelength band that is allowed to pass through the input port.

4. The optical transmission apparatus according to claim 2, wherein
the controller instructs the first optical attenuation amount and the second optical attenuation amount to the intensity adjuster, based on setting of a wavelength band for the input port.

5. The optical transmission apparatus according to claim 2, wherein
the controller determines the first optical attenuation amount, based on signal quality of the optical signal.

6. The optical transmission apparatus according to claim 2, wherein
the controller determines the first optical attenuation amount, based on a property inverse to a transmissive property of wavelength selector.

7. The optical transmission apparatus according to claim 2, further comprising
a plurality of the multiplexer, wherein
the controller adjusts an optical attenuation amount in an edge band of a wavelength band being set for the input port included in each multiplexer.

8. An optical transmission apparatus, comprising:
a demultiplexer configured to demultiplex a wavelength multiplexed optical signal from an optical transmission path; and
a receptor configured to receive an optical signal from the demultiplexer, the optical signal being a single channel signal, wherein
the demultiplexer includes:
an input portion configured to filter the wavelength multiplexed optical signal and output the optical signal, the filtered optical signal comprising a pass through wavelength band;
an intensity adjuster, configured to attenuate the filtered optical signal by adjusting a first optical attenuation amount to be smaller than a second optical attenuation amount, the first optical attenuation amount corresponding to edge band in the pass through wavelength band, the second optical attenuation amount corresponding to a center band in the pass through wavelength band; and
an output port configured to output the optical signal.

9. An optical transmission method, comprising:
filtering an optical signal, the filtered optical signal comprising a pass through wavelength band, the optical signal being a single channel signal;
attenuating the filtered optical signal by adjusting a first optical attenuation amount to be smaller than a second optical attenuation amount, the first optical attenuation amount corresponding to an edge band in the pass through wavelength band, the second optical attenuation amount corresponding to a center band in the pass through wavelength band; and
outputting a wavelength multiplexed signal including the attenuated optical signal.

* * * * *